United States Patent
Alban et al.

(10) Patent No.: US 12,503,381 B2
(45) Date of Patent: Dec. 23, 2025

(54) METHOD FOR OPTIMIZING THE ENERGY CONSUMPTION OF AN AERATOR IN THE FIELD OF WATER TREATMENT

(71) Applicant: L'Air Liquide, Société Anonyme pour l'Etude et l'Exploitation des Procédés Georges Claude, Paris (FR)

(72) Inventors: Bruno Alban, Verrières le Buisson (FR); Philippe Campo, Montigny le Bretonneux (FR); Frederic Goulas, Gron (FR); Fabrice Bouquin, Guyancourt (FR); Guillaume Beaudoin, Guyancourt (FR)

(73) Assignee: L'Air Liquide, Société Anonyme pour l'Etude et l'Exploitation des Procédés George Claude, Paris (FR)

( * ) Notice: Subject to any disclaimer, the term of this patent is extended or adjusted under 35 U.S.C. 154(b) by 0 days.

(21) Appl. No.: 17/209,727

(22) Filed: Mar. 23, 2021

(65) Prior Publication Data
US 2021/0317021 A1  Oct. 14, 2021

(30) Foreign Application Priority Data
Mar. 23, 2020 (FR) .................................. 2002803

(51) Int. Cl.
| | |
|---|---|
| *C02F 3/26* | (2023.01) |
| *B01F 23/234* | (2022.01) |
| *B01F 27/71* | (2022.01) |
| *B01F 27/91* | (2022.01) |
| *C02F 3/12* | (2023.01) |

(Continued)

(52) U.S. Cl.
CPC ............ *C02F 3/26* (2013.01); *B01F 23/2342* (2022.01); *B01F 23/234211* (2022.01); *B01F 27/71* (2022.01); *B01F 27/91* (2022.01); *C02F 3/1284* (2013.01); *C02F 3/16* (2013.01);
(Continued)

(58) Field of Classification Search
None
See application file for complete search history.

(56) References Cited

U.S. PATENT DOCUMENTS

| | | | |
|---|---|---|---|
| 4,280,910 A | 7/1981 | Baumann | |
| 4,869,818 A * | 9/1989 | DiGregorio | ............. C02F 3/205 |
| | | | 210/219 |

(Continued)

FOREIGN PATENT DOCUMENTS

| | | |
|---|---|---|
| EP | 0 995 485 | 4/2000 |
| FR | 2 594 112 | 8/1987 |

(Continued)

OTHER PUBLICATIONS

French Search Report for corresponding FR 2002803, dated Nov. 17, 2020.

*Primary Examiner* — Chester T Barry
(74) *Attorney, Agent, or Firm* — Yan Jiang

(57) ABSTRACT

Disclosed is a method for managing the operation of an apparatus for injecting oxygen into a purification basin. The oxygen notably being used by the biomass present in the purification basin to consume the pollution present in an effluent feedstock contained in the basin. The method comprises varying a rotational speed of the shaft by using a frequency variator, wherein an applied variation in speed is between plus 15% and minus 15% of the nominal speed of the shaft.

7 Claims, 1 Drawing Sheet

(51) Int. Cl.
*C02F 3/16* (2023.01)
*B01F 23/237* (2022.01)
*B01F 101/00* (2022.01)

(52) U.S. Cl.
CPC . *B01F 23/237612* (2022.01); *B01F 2101/305* (2022.01); *B01F 2215/0481* (2013.01)

(56) References Cited

U.S. PATENT DOCUMENTS

| | | | |
|---|---|---|---|
| 6,270,061 B1* | 8/2001 | Bouquet | B01F 23/2368 |
| | | | 261/87 |
| 6,723,244 B1* | 4/2004 | Constantine | C02F 3/1268 |
| | | | 210/624 |
| 2008/0102514 A1* | 5/2008 | Coallao Olivares | C12M 41/32 |
| | | | 435/303.3 |
| 2010/0253172 A1* | 10/2010 | Kupisiewicz | H02K 3/16 |
| | | | 318/807 |
| 2011/0127214 A1* | 6/2011 | Rico Martinez | C12M 27/02 |
| | | | 210/139 |
| 2013/0026001 A1* | 1/2013 | Gonzalez Alemany | |
| | | | B66B 23/026 |
| | | | 198/322 |
| 2015/0265979 A1 | 9/2015 | McIvor | |
| 2016/0060150 A1 | 3/2016 | Beaudouin et al. | |
| 2017/0025909 A1* | 1/2017 | Hummel | H02K 21/12 |
| 2020/0321783 A1* | 10/2020 | Corradin | H02J 13/00002 |
| 2021/0054515 A1* | 2/2021 | Vidaurre Heiremans | |
| | | | B01F 33/406 |

FOREIGN PATENT DOCUMENTS

| | | |
|---|---|---|
| WO | WO 2012 160300 | 11/2012 |
| WO | WO 2013 082059 | 6/2013 |

* cited by examiner

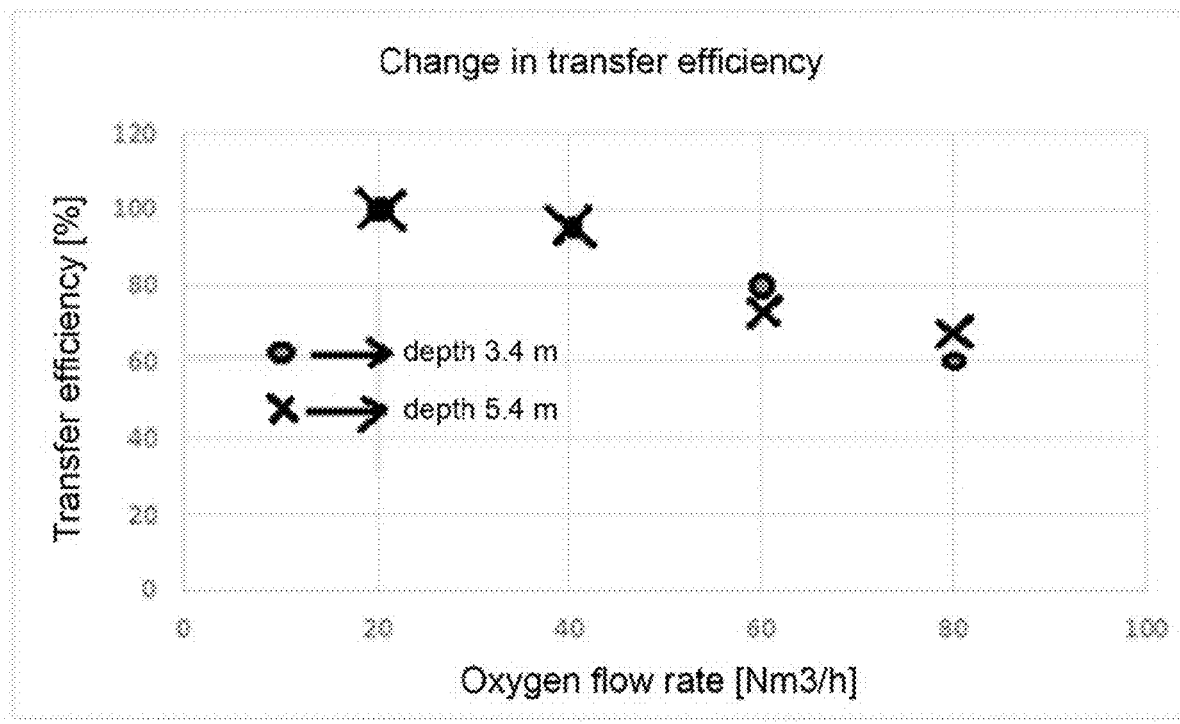

METHOD FOR OPTIMIZING THE ENERGY CONSUMPTION OF AN AERATOR IN THE FIELD OF WATER TREATMENT

CROSS REFERENCE TO RELATED APPLICATIONS

This application claims the benefit of priority under 35 U.S.C. § 119 (a) and (b) to French Patent Application No. 2002803, filed Mar. 23, 2020, the entire contents of which are incorporated herein by reference.

TECHNICAL FIELD

The present invention relates to the field of water treatment, and is notably concerned with apparatus for injecting oxygen into purification basins. This oxygen is used by the biomass present in the basins to consume the pollution present in the water.

BACKGROUND

The following documents illustrate examples of such apparatus: WO2012160300A1, EP-995 485, FR-2594112A1.

But more generally, the invention relates to apparatus positioned at the surface of the basin and equipped with a system enabling it to be kept (floating) above the water, and comprising:
- system for injecting an oxygen-rich gas (typically containing between 22% and 100%, preferably between 80 and 100% oxygen). The injection system may be a simple ring pierced with orifices, or else a porous plug, and these systems may be accompanied by additional systems such as, for example, a moving part with straight or inclined blades; a venturi with a pump may also be suitable by way of a system for injecting such a gas rich in oxygen;
- moving part for mixing and for dispersing the gas, such as a three-bladed impeller or a Rushton turbine, etc.

SUMMARY

The present invention is most particularly concerned with the control cabinets that control the operation of such apparatus.

These cabinets notably allow control of the motors of this apparatus, and of the management of the injection of the oxygen-rich gas.

Tests conducted by the Applicant on an apparatus such as the one described in document WO2012160300A1 have demonstrated that, for low flow rates of oxygen injected in such an apparatus, it is possible to reduce the power consumed while at the same time maintaining effectiveness of the agitation/mixing of the medium and a transfer of gas into the medium equivalent to the nominal power used, i.e. the power consumed by the motor when the motor is powered at the mains frequency without modification (usually 50 Hz).

This change in power consumed by the apparatus has been achieved by reducing the size of the main moving part, the pumping impeller.

In such floating aeration apparatus, the performance (flow rates of gas/oxygen actually dissolved and therefore available for the treatment and therefore for the bacteria) is dependent, other than on the design of the agitation system, on both the agitation speed and the gas flow rate.

Hence, in order to avoid encountering mediocre efficiencies, there is a general tendency to keep the agitation flow rate constant (therefore at the nominal value) and to do so regardless of the injected gas flow rate (across the entire performance range in general, namely between zero and the maximum gas flow rate).

Now, it has been found that the oxygen requirement may be low, or even zero, for a good proportion of the time during the day, for up to 80% of the time during a day.

Keeping the apparatus at their nominal speed therefore entails needless continuous electrical power consumption.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows that the transfer effectiveness or efficiency increases, for a given rate of agitation, when the flow rate of injected gas is decreased.

DETAILED DESCRIPTION OF PREFERRED EMBODIMENTS

The present invention therefore proposes to adapt the operation of the apparatus, according to the oxygen requirement of the medium and/or according to the flow rate of gas to be injected, this being, as will have been appreciated, with a view to optimizing the electrical power consumption of the equipment according to the true requirement for pure oxygen.

In order to do so, it proposes the use, in the control cabinet, of a frequency variator providing control of the motor of the apparatus used for injecting the oxygen-rich gas. The variator acts on the frequency of the power supply to the motor and therefore on the rotational speed of the shaft on which the agitation/dispersion/injection moving part(s) is/are mounted.

By way of illustration, the following modes of operation may be implemented:
- Nominal mode: the apparatus operates (in terms of agitation and of injection) for a given range at its nominal speed, namely the speed for which it was designed. In other words, the apparatus operates at the mains frequency; at this frequency it implements a nominal rotational speed which leads to a nominal injection and gas transfer capacity.
- Maximum mode: the apparatus can be accelerated by increasing the frequency of the power supply to the motor (within the acceptable limits of the mechanical design tolerances, particularly for the motor), and this has the effect of increasing both the agitation and (as a result) the dispersion of the gas that is injected and therefore of boosting the injection of gas beyond the design value. In the case of apparatus for which a high gas flow rate might threaten to choke the equipment, which equipment is equipped for example with a self-aspirating turbine, this powering at a frequency that is permissible but higher than the design value allows the chokingflow rate limit to be pushed back. Specifically, depending on the design of the motor, in order to reduce the electrical power consumption in instances in which the oxygen requirement is low (typically <50% of the maximum injection flow rate) it is generally possible to reduce the frequency by 10 to 20 Hz. In instances in which it is desirable to increase the injection capability (injection flow rate higher than the maximum flow rate at the frequency of 50 Hz) it is possible to increase the frequency of the power supply to the motor by around 10 Hz, often between 2 and 5 Hz.

Minimum/reduced-operation mode: the rotational speed of the moving parts of the apparatus (self-aspirating turbine, shear blades, mixing impeller, etc.) is then slowed (frequency lower than the nominal). At the same time, the oxygen flow rate is reduced in order to maintain, at this reduced rotational speed, a gas transfer efficiency equivalent to nominal operation of the equipment. The nominal speed is effectively not required, for this reduced gas flow rate, to maintain good dispersion, and therefore good efficiency of absorption, of the gas.

Therefore, having the possibility to vary the rotational speed of the equipment/the agitation speed, using a frequency variator (within a certain range acceptable to the apparatus, particularly to the motor), means that the total energy consumption over the course of the day will be reduced (for example spending 80% of the time in reduced operation mode), and this can be achieved without detriment to the effectiveness of the equipment.

A person skilled in the art of the aeration of liquid media is familiar with this notion of "nominal" speed.

Specifically, such aerators are assemblies of standardized components, performing the two functions necessary to maximize aeration: i.e. agitating the liquor and dispersing the gas.

The components are offered by the manufacturers of such aerators who have designed and optimized them for that purpose:

a motor: its design imposes a speed range, a number of poles, characteristics of its electrical power supply (including the nominal frequency imposed by the national electricity providers: which in France is 50 Hz). The most commonplace motors rotate at around 1200 rpm for a 50 Hz power supply. The number of poles (winding) allows the alternating current (alternating at its frequency) to turn the shaft contained at the centre of the poles at what is therefore the nominal speed.

at least one agitation-mixing system such as an impeller, a turbine, etc. which will convert the movements of the shaft/the power transmitted by the shaft into movement of the fluid/mixed liquor and ensure the dispersion of the gas. These systems are designed and manufactured by suppliers who once again stipulate the correct operating or service range, this being a range of rotational speeds about a nominal point.

A speed of 200-500 rpm corresponds to a range often recommended by manufacturers for moving fluids such as water (which are therefore fluids that are not excessively viscous, but rather of the Newtonian fluid type). By contrast, for highly viscous fluids (pasty, non-Newtonian fluids, etc.), use is traditionally made of different moving parts (Archimedean screws for example which offer a maximum surface area to the fluid) and which rotate very slowly (<100 rpm).

In other words, a person skilled in the art of aerators knows that for each type of hardware the manufacturer provides a range of rotational speeds that is recommended "by design".

The present invention therefore has the merit of having proposed varying the operation of the aerator without significant modification and without damage to any part, by making the observation that there is absolutely no need to permanently maintain a fixed operating point and that there are true gains to be had by shifting it a little, very slightly around this point:

a little more in order to achieve greater aeration when the basin requires this (peak loading), without the need for additional investment.

a little less for the majority of the day for a basin because the pollution does not arrive continuously, thus minimizing the power consumption.

Nevertheless, and in order to clarify the operating conditions recommended by the present invention, the preferred ranges for this rotational speed are indicated here:

between 50 and 1000 rpm: This is because it can be considered that, above this range, one is looking at highly specific agitators that are only used little, if at all, in the field of the present invention and, likewise, below this range are found agitators which rotate slowly in order to agitate pasty fluids.

and, more preferably, between 50 and 500 rpm: because it may effectively be considered that, above 500 rpm, are found small moving parts or else specialist forms which have little if any application to the field targeted by the present invention.

and, more preferably still, between 150 and 350 rpm.

One example of operation on a floating apparatus, driving the gas injected from the bottom using agitators/impellers mounted on an agitation shaft, an apparatus like the one described in document WO2012/160300A1, is described hereinbelow.

The curves provided in the attached FIG. 1 (one for a system at a depth of 3.4 m, and the other at 5.4 m) show that the transfer effectiveness or efficiency increases, for a given rate of agitation, when the flow rate of injected gas (in this instance pure oxygen) is decreased.

The invention therefore profits from this gain in order to decrease the agitation speed and maintain a high transfer efficiency (generally >80%).

The transfer efficiency mentioned here is determined according to the standard method described in the literature which consists in, starting from an initial dissolved-oxygen value close to 0, injecting the gas ($O_2$) at a fixed flow rate and monitoring, as a function of time, how the oxygen concentration in the water changes. From this curve (which is asymptotic, with a final value corresponding to saturation), the transfer coefficient (termed $kL \cdot a$) or the quantity actually dissolved (and therefore transferred) is deduced. Finally, the efficiency corresponds to the ratio between the quantity dissolved and the quantity injected.

One example of an implementation in an activated sludge basin used in a water treatment plant is described hereinbelow.

This basin is aerated and agitated by floating oxygen-injection apparatus like that described in document WO2012160300A1.

In normal ("nominal") operation, the consumption is $P°=16$ kW for an agitation speed of $N°=283$ rpm and an agitator diameter $D=680$ mm (the diameter of the impeller at the end of the shaft in the above-mentioned document, which creates the overall movement, therefore both the agitation and the mixing movement and therefore causes the dispersion of the gas in the basin).

The flow rate of gas (oxygen) injected for this nominal operation is of the order of 56 $Nm^3/h$ with a transfer rate of the order of 80% in true conditions.

Hence, in continuous operation (continuous agitation speed and gas flow rate) the power consumption will be:

$P \text{ total} \sim 1.38 \ 10^6 \text{ kJ/day} = 16000 \times 24 \times 3600$

It may be noted that under turbulent conditions, the dimensionless quantity referred to as "power" Np is constant (regardless of the operating parameters N and D), being expressed according to the following formula:

$Np=P/(\rho \cdot N^3 \cdot D^5)$ where $\rho$ is the density of the agitated medium (in this example, water, considered to be 1000 kg/m$^3$).

(N: agitation speed in rev/s, and D diameter of the main moving part in m)

In this instance, $Np\sim1.05=16000/[1000\times(283/60)^3\times0.685]$

In the context of the present invention, considering that for 80% of the time, namely outside of the period in which peak pollution arrives at the wastewater treatment plant, the oxygen requirement is far lower, this lower requirement now requires the apparatus to inject only between 0 and 30 Nm$^3$/h, maintaining a transfer efficiency of the order of 80%. The apparatus will therefore operate at a reduced speed for 80% of the day (namely for 19.2 hours out of 24) when the requirement for oxygen (pure oxygen or oxygen-rich gas) is between 0 and, in this instance, 30 Nm$^3$/h.

This operation at reduced speed makes it possible to maintain an agitation/mixing capacity that is sufficient for keeping the sludge (biological floc) in suspension in the basin and for maintaining a gas transfer capacity that is equivalent (to within + or −5%) to that determined for nominal operation of the equipment.

In our example, the speed is reduced by just 8%, which gives N*=263 rpm.

And thus the new power consumption $P^*\sim12.8 \text{ kW}=1.05\times 1000^*(263/60)^3\times0.68^5$ The new total energy consumption for the day will be:

$P \text{ tot}^*=1.16 \cdot 10^6 \text{ kJ/day}=(16000\times4.8+12800\times19.2)\times 3600$ This in effect corresponds to the contribution of each type of operation during the day.

The energy savings realized by virtue of the invention by adding a speed variator therefore represent around 16%, this being achieved simply by varying the agitation speed by 8% and obviously keeping an agitation/mixing efficiency high enough to keep the sludge in suspension and achieve a gas transfer equivalent to that which is achieved under nominal conditions.

The present invention therefore relates to a method for managing the operation of an apparatus for injecting oxygen into a purification basin, the oxygen notably being used by the biomass present in the basin to consume the pollution present in an effluent feedstock contained in this basin, the apparatus being characterized by the following components and functionalities:
- the apparatus is positioned at the surface of the basin and equipped with a system enabling it to be kept floating above the liquid;
- it comprises a drive device, intended to be positioned above the liquid, and provided with a vertical or inclined output shaft, the shaft being equipped at its end with at least one moving part for mixing and for dispersing the injected gas, such as a three-bladed impeller;
- it comprises a system for injecting an oxygen-containing gas (typically containing between 20% and 100%, preferably between 80 and 100% oxygen);
- the method being characterized in that a frequency variator is used to vary the rotational speed of the shaft, the applied variation in speed being comprised between plus 15% and minus 15% of the nominal speed of the equipment, and more preferably between plus 10% and minus 10% of the nominal speed of the equipment, i.e. the speed under conditions in which the motor is powered at the mains frequency without modification, this being so as to optimize the electrical power consumption according to the need for injection of the oxygen-containing gas and the necessary agitation capacity for the purification basin in which the equipment is installed.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

As used herein, "about" or "around" or "approximately" in the text or in a claim means ±10% of the value stated.

"Range" or "ranges" as used herein in the text and claims may be expressed as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

All references identified herein are each hereby incorporated by reference into this application in their entireties, as well as for the specific information for which each is cited.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for managing the operation of an apparatus for injecting oxygen into a purification basin, the oxygen notably being used by a biomass present in the purification basin to consume the pollution present in an effluent feedstock contained in the purification basin, the apparatus including the following components and functionalities:

the apparatus is positioned at the surface of the purification basin and equipped with a system enabling it to be kept floating above the liquid;

the apparatus includes a drive device, positioned above the liquid, and provided with a vertical or inclined output shaft, the shaft being equipped at its end with at least one moving part for mixing and for dispersing the injected oxygen; and the apparatus includes a system for injecting oxygen; the method comprising varying a rotational speed of the shaft by using a frequency variator, wherein an applied variation in speed is between plus 15% and minus 15% of the nominal speed of the shaft.

2. The method of claim 1, wherein the applied variation in speed is between plus 10% and minus 10% of the nominal speed of the shaft.

3. The method of claim 1, further comprising powering a motor of the shaft provided in the drive device at the main frequency without modification to maintain the speed of the shaft, so that an electrical power consumption is optimized according to a need for injection of the oxygen-containing gas and a necessary agitation capacity for the purification basin in which the shaft is installed.

4. The method of claim 1, wherein the at least one moving part is a three-bladed impeller.

5. The method according to claim 1, wherein the nominal rotational speed is situated in the range between 50 and 1000 rpm.

6. The method according to claim 1, wherein the nominal rotational speed is situated in the range between 50 and 500 rpm.

7. The method according to claim 1, wherein the nominal rotational speed is situated in the range between 150 and 350 rpm.

* * * * *